United States Patent [19]
George et al.

[11] 3,909,138
[45] Sept. 30, 1975

[54] METHOD AND APPARATUS FOR DETECTING SKIPS IN GRAVURE PRINTING

[75] Inventors: Harvey F. George, West Hempstead; Robert H. Oppenheimer, Glen Cove; Charles G. Marrara, Franklin Square; David W. Cairns, Glen Cove, all of N.Y.

[73] Assignee: Gravure Research Institute, Inc., Port Washington, N.Y.

[22] Filed: June 3, 1974

[21] Appl. No.: 475,958

[52] U.S. Cl. ............... 356/237; 250/563; 356/209; 356/212
[51] Int. Cl.² .................. G01N 21/16; G01N 21/32
[58] Field of Search .......... 356/237, 209, 210, 211, 356/212, 202, 203; 250/563, 572

[56] References Cited
UNITED STATES PATENTS
3,347,131   10/1967   Clauer et al. ..................... 356/209

*Primary Examiner*—Vincent P. McGraw
*Attorney, Agent, or Firm*—Morgan, Finnegan, Pine, Foley & Lee

[57] ABSTRACT

A method and apparatus for detecting skips in gravure prints including means for scanning an area of paper having gravure print thereon and generating output signals proportional to the amount of reflectivity of the area of the paper being scanned, stabilizing means for stabilizing the output signals to reduce the effects of signal drift, means for comparing the output signals from the stabilizing means with a reference signal level, filter means for passing a predetermined signal frequency band, pulse forming means electrically coupled to the filter means capable of generating a pulse in response to each filtered signal received, threshold means for activating the pulse forming means only when the filtered signals to the pulse forming means reach a predetermined signal level, and counter means for counting pulses generated by the pulse forming means.

13 Claims, 3 Drawing Figures

METHOD AND APPARATUS FOR DETECTING SKIPS IN GRAVURE PRINTING

The present invention relates to a method and apparatus for measuring gravure print smoothness, and more specifically to a method and apparatus for detecting and counting the skips in gravure prints which are visible to a reader. "Gravure print smoothness" is defined as the absence of skips in highlights and midtones having a density of about 0.3 for black ink. A "skip" is defined as the presence of a visibly missing or defective dot in highlight and midtones.

Generally, gravure print smoothness is determined by visually comparing a standard specimen with a test specimen with or without the aid of magnification. If too many skips are observed in the test specimen it is rejected. This approach is time consuming and less than satisfactory from the viewpoint of standardization of gravure print smoothness.

More sophisticated systems have been developed to detect each individual dot or a portion thereof. Parameters representative of the dots are plotted or fed to a computer which stores the information, e.g., shape, tone, etc. Each individual dot may then be reconstructed, as desired. Such systems, even without a computer, require rather costly and high precision equipment. If a computer is used, the cost is further increased.

It is an object of the present invention to provide a method and apparatus for detecting skips in gravure print which are visible to a reader.

It is a further object of the present invention to provide a method and apparatus for detecting skips in gravure print by scanning individual areas within the larger area of a printed paper sample to be tested; the individual area includes a plurality of dots.

It is a further object of the present invention to reduce the effects of signal drift caused by a variation in scanning area illumination as well as paper and ink tones.

Other objects, aspects, and advantages of the pesent invention will be apparent when the detailed description is considered with the drawing.

Briefly, the method and apparatus of the present invention includes the steps of and associated apparatus for generating an output signal proportional to the amount of reflectivity of the area being scanned, stabilizing the output signal representative of reflectivity by converting it into a signal corresponding to the log of the reflected light, comparing this signal with a reference signal and transmitting the difference signal, filtering the difference signal to remove d.c. components and a.c. ripple, corresponding to the details of the dot structure, forming the filtered signal into a pulse only when the amplitude of the filtered signal is above a predetermined level, and counting the number of pulses.

The present invention is illustrated with reference to the accompanying drawings, as follows.

Figure 1:
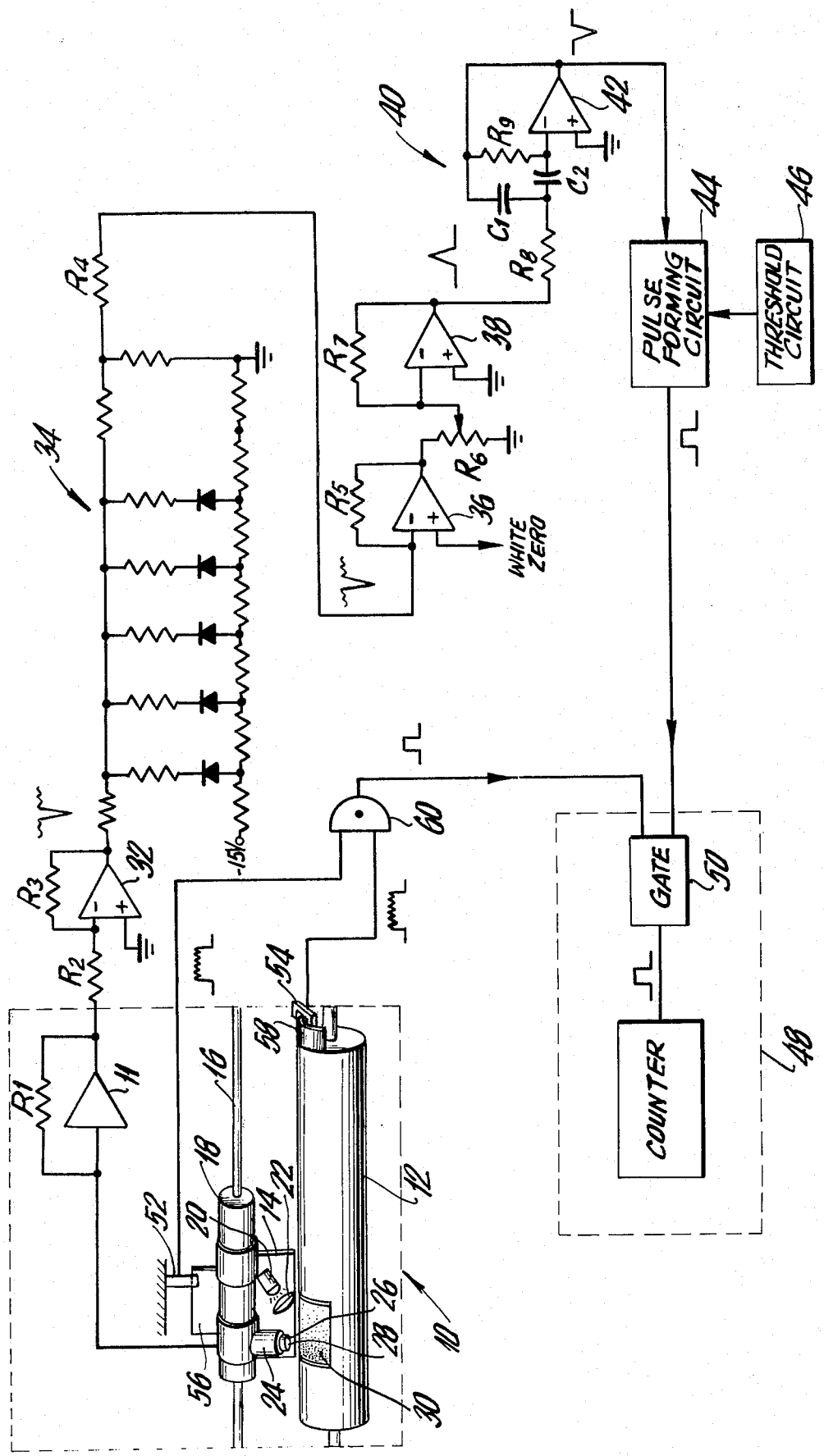
FIG. 1 is a partial block and schematic diagram of the apparatus for detecting skips in gravure print smoothness.

Referring to FIG. 1, the present invention includes a photosensitive scanner and transmitter 10 having an internal amplifier 11. Such a scanner and transmitter 10 is available commercially from Hell GMBH (Germany) Model TS 985, and is known as a Telephoto Transmitter. However, other types of scanner-transmitters may also be employed, such as the Datalog Model TD 4181 Facsimile Transmitter, available from Litcom, a division of Litton Industries.

The scanner and transmitter 10 includes a rotatable cylinder 12, an optical carriage 14, optical carriage drive means 16, associated electronics 18, and internal amplifier 11. The cylinder 12 is rotated at a constant speed, e.g., 120 RPM, by a synchronous motor (not shown). The optical carriage drive means 16 is activated by the same synchronous motor and a gear reduction drive (not shown) to move the optical carriage 14 at a constant linear rate in a longitudinal direction adjacent the cylinder 12.

The optical carriage 14 includes an excitation lamp 20, a focusing lens 22, a photomultiplier 24, and a scanning aperture 26, including a focusing lens 28, in conjunction with the photomultiplier 24. As the optical carriage 14 is driven at a constant linear rate, the light reflected from an area of the cylinder 12 corresponding to the diameter of the scanning aperture 26 is received thereby and transmitted to the photomultiplier 24. The diameter of the scanning aperture 26 may vary between about 0.012 to about 0.016 inches to cover all or most of four dots on a standard 150 line gravure screen. An aperture of this size allows signal variations which would otherwise occur due to the random line up of the screen ruling of the print with the scanning direction to be substantially averaged out while still producing a detectable change in signal level when a visible skip is encountered. The printed paper sample 30 to be evaluated is affixed to the cylinder 12 and the light is reflected from individual area 31, see FIG. 3, through the scanning aperture 26 to the photomultiplier 24.

Figure 3:
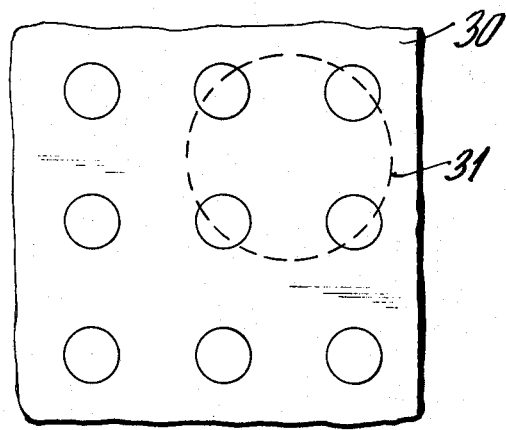
FIG. 3 is an enlarged plan view of a portion of the printed paper to be scanned showing the individual area scanned by the aperture of the photosensitive scanner and transmitter.

The output of the photomultiplier 24 is conditioned by conventional electronics 18 and internal amplifier 11 to provide a signal representative of the amount of light reflected from area 31 of the sample paper 30 which is defined by the diameter of the scanning aperture 26, see FIG. 3.

The output signal from internal amplifier 11 is amplified by preamplifier 32 (linear differential amplifier) to further increase the signal strength. The output of preamplifier 32 is electrically coupled to a conventional log circuit 34, such as is available from Teledyne Phibrick Nexus Corp. The log circuit 34 includes a plurality of interconnected resistors and diodes which convert the output signal from preamplifier 32 into the log of the signal. The difference in the output signal levels of preamplifier 32 between an area with a skip and without a skip depends on the differences in the reflectivities of the two areas and the level of illumination of the two areas. The ratio of the output signal levels of preamplifier 32 of an area with a skip and an area without a skip depends only on the ratio of the reflectivities and is largely independent of the level of illumination. By converting the output signals to their logarithms, the change in the signal during transition from an area without a skip to an area with a skip will produce a change in signal level at the output of the log circuit 34 which is proportional to the ratio of the signal levels at the output of preamplifier 32, i.e., the change in signal level is largely independent of the level of illumination of the scanned area. The log circuit 34 therefore eliminates the effects of slow drift in the intensity of the lamp 20.

The output from the log circuit 34 is electrically coupled to one input of operational amplifier 36 (linear differential amplifier). The other input to the operational amplifier 36 is maintained at a predetermined bias or reference signal level. Generally, the reference signal level will be chosen so that the margin of the printed paper 30 (non-printed white portion) corresponds to a signal output of zero. The difference output signal from operational amplifier 36 is electrically coupled to another operational amplifier 38 (linear differential amplifier), which includes a variable input resistor $R_6$, for further amplification as desired. The operational amplifier 38 and variable resistor $R_6$ advantageously provide high gain for low density prints and low gain for high density or contrasting prints.

Operational amplifier 38 is electrically coupled to a bandpass filter generally indicated at 40. The bandpass filter is of the active type, incorporating operational amplifier 42. Typical component values are as follows: $R_8$=10K, $R_9$=47K, $C_1$=0.01μfd, and $C_2$=0.0068μfd. The bandpass filter 40 advantageously has its passband centered at 1100 Hz. However, the central frequency of the passband may be varied, as required, depending upon the number of lines per screen and the scanning rate. The bandpass filter 40 removes fine ripple (a.c.) due to the dot structure, slow changes due to paper formation, and any d.c. components introduced into the signal.

The output of operational amplifier 42 is electrically coupled to a conventional pulse forming circuit 44. The pulse forming circuit 44 may be a one-shot multivibrator in the form of a Schmitt Trigger which produces an output pulse in response to an input signal of a given amplitude. A conventional threshold circuit 46 is electrically coupled to the pulse forming circuit 44 to establish a threshold amplitude level for the pulse forming circuit 44 above which the pulse forming circuit 44 will produce an output pulse.

The output pulse from the pulse forming circuit 44 is applied to a conventional digital counter 48, which is commercially available from Computer Measurements Co. Such a counter in addition to the counter logic includes an internal gate 50, which may be in the form of an AND gate or an SCR, for transmitting the output pulse to the counter; the gate 50 is activated by coincident input signals.

Figure 2:
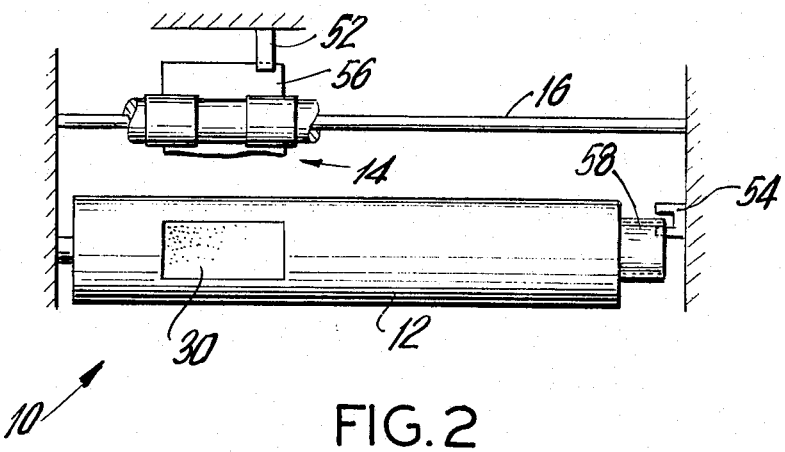
FIG. 2 is a top plan view of the photosensitive scanner and transmitter showing the means for defining the area of the rotating cylinder to be scanned.

Referring to FIG. 2, one of the coincident input signals is derived from a pair of photcells 52 and 54, such as photon coupled interruptor modules available from General Electric Co., as GE H 13 A1. These modules include a light emitting diode and a phototransistor for producing an output signal during the time when light transmission to the phototransistor is interrupted.

Light transmission to the phototransistor of photocell 52 is interrupted by a marker element or flag 56 which defines the longitudinal or axial dimension of the printed paper sample 30 to be scanned. The flag 56 is mechanically coupled to the optical carriage 14 and moves therewith. As the flag 56 passes between the light emitting diode and the phototransistor it prevents the light from the light emitting diode from reaching the phototransistor, thereby activating the photocell 52. The operation of the photocell 54 is similar. A marker element or flag 58 is mechanically coupled to the cylinder to define the circumferential dimension of the printed paper sample 30 to be scanned. The longitudinal and circumferential flags 56 and 58 define the bounds or limits of the area of the printed sample paper 30 to be scanned. (It should be understood that other means may be used for defining the area to be scanned, such as limiting lines and flip-flops.)

The photocells 52 and 54 are electrically coupled to an AND gate 60. AND gate 60 produces a positive output only when signals from photocells 52 and 54 are coincident at its inputs, i.e., when flags 56 and 58 are interrupting light transmission. The output of AND gate 60 is electrically coupled to internal gate 50. When internal gate 50 receives signals from AND gate 60 and pulse forming circuit 44, the pulse is registered in the counter 48.

In practicing the method of the present invention, a paper sample 30, e.g., coated or uncoated paper stock, which has been subjected to gravure printing, is affixed to the cylinder 12. The area of the printed paper sample 30 to be scanned is aligned with longitudinal and circumferential flags 56 and 58. The synchronous motor for the cylinder 12 and optical carriage drive means 16 are activated. Excitation lamp 20 and photocells 52 and 54 are also activated. The optical carriage 14 moves along the cylinder 12 at a constant rate as the cylinder 12 rotates at a constant rate. The photomultiplier 24 produces an output signal proportional to the amount of reflected light transmitted through the scanning aperture 26. The output signal from the photomultiplier 24 is conditioned and amplified, as desired, stabilized, compared to a standard reference level, further amplified, filtered, and applied to a pulse forming circuit 44. A threshold circuit 46 biases the pulse forming circuit 44 so that it produces an output pulse only when the input signal is above a predetermined amplitude which is representative of skips visible to the human eye. The output pulse from the pulse forming circuit 44 is applied to the gate 50 of counter 48 and registered therein when a control signal from photocells 52 and 54 is coincident with the output pulse.

The photocells 52 and 54 are electrically coupled to AND gate 60 which produces a positive output only upon receiving coincident signals from photocells 52 and 54. The positive output from the AND gate 60 is the control signal which is applied to gate 50 to provide registration of the output pulse from the pulse forming circuit in the counter 48.

The total number of counts registered by the counter 48 during scanning of the printed paper sample 30 is compared to a standard number of acceptable counts per area of sample paper 30 and the sample paper 30 is either accepted or rejected.

It should be understood by those skilled in the art that various modifications may be made in the present invention without departing from the spirit and scope thereof as described in the specification and defined in the appended claims.

What is claimed is:

1. A method of detecting skips in gravure prints, comprising the steps of:

a. scanning a paper sample which has been subjected to gravure printing;

b. generating an output signal proportional to the amount of light reflected from a predetermined area of the paper sample which is being scanned;

c. stabilizing the output signal;

d. comparing the stabilized signal with a reference signal to produce a difference signal;

e. filtering the difference signal;

f. forming the difference signal into a pulse when the amplitude of the difference signal exceeds a predetermined amplitude level; and g. registering each pulse formed in a counter.

2. The method recited in claim 1 including the steps of:

h. inhibiting registration of the pulse in the counter until the counter is enabled by a control signal;

i. applying a control signal to the counter only when the output signal generated in step (a) is produced within a predetermined area of the paper sample.

3. The method recited in claim 1 wherein:
the step of stabilizing the output signal includes converting it into a log function.

4. The method recited in claim 1 wherein:
the predetermined area from which the output signal is generated in step (b) includes a plurality of dots.

5. An apparatus for detecting skips in gravure prints, comprising:

means for scanning a predetermined area of a paper sample which has been subjected to gravure printing and generating an output signal representative of skips in gravure print smoothness;

means for providing a signal proportional to the ratio in the signal level of skips and non-skips to substantially eliminate errors due to signal drift;

means for comparing the ratio signal with a reference signal level to provide a difference signal;

filter means electrically coupled to said comparing means for filtering the difference signal;

means for forming a pulse electrically coupled to said filter means;

threshold means for activating said pulse forming means only when the filtered signal to said pulse forming means reaches a predetermined signal level; and counter means electrically coupled to said pulse forming means for counting the pulses produced by said pulse forming means.

6. The apparatus as claimed in claim 5 including:
means for defining an area of the paper sample to be scanned by said scanning means;

means for activating said counter only when said scanning means is within the area of the paper sample established by said defining means.

7. The apparatus as claimed in claim 6 wherein:
said activating means includes a pair of photocells coupled to an AND gate.

8. The apparatus as claimed in claim 7 wherein:
said counter means includes a gate whose inputs include the output of said AND gate and the output of said pulse forming circuit.

9. The apparatus as claimed in claim 5 wherein:
said scanning means includes a photomultiplier.

10. The apparatus as claimed in claim 5 wherein:
said filter means is a bandpass filter.

11. The apparatus as claimed in claim 5 wherein:
said scanning means scans a predetermined area including a plurality of dots.

12. An apparatus for detecting skips in gravure prints, comprising:

photosensitive means for scanning a paper sample which has been subjected to gravure printing and providing an output signal proportional to the amount of light reflected by the scanned portion of the paper sample;

log means for converting the output signal into a ratio between the signal level for skips and non-skips;

means for comparing the ratio signal with a reference signal level to provide a difference signal;

bandpass filter means for removing unwanted signal components from the difference signal;

pulse forming means electrically coupled to said bandpass filter means;

threshold means for activating said pulse forming means only when the filtered signal reaches a predetermined level;

a counter electrically coupled to said pulse forming means through a gate; and means electrically coupled to said gate for activating said counter only when said photosensitive means is scanning a predetermined area of the paper.

13. The apparatus as claimed in claim 12, wherein:
said photosensitive means includes an aperture having a diameter in the range of about 0.012 to 0.016 inches for scanning a plurality of dots on the paper sample.

* * * * *